(12) United States Patent
Hubbard et al.

(10) Patent No.: US 9,399,865 B2
(45) Date of Patent: Jul. 26, 2016

(54) SEISMIC ISOLATION SYSTEMS

(75) Inventors: Don A. Hubbard, Valencia, CA (US);
Gil A. Moreno, San Clemente, CA (US)

(73) Assignee: WORKSAFE TECHNOLOGIES,
Valencia, CA (US)

(*) Notice: Subject to any disclaimer, the term of this patent is extended or adjusted under 35 U.S.C. 154(b) by 0 days.

(21) Appl. No.: 14/130,069

(22) PCT Filed: Jun. 28, 2012

(86) PCT No.: PCT/US2012/044685
§ 371 (c)(1),
(2), (4) Date: Jun. 18, 2014

(87) PCT Pub. No.: WO2013/003614
PCT Pub. Date: Jan. 3, 2013

(65) Prior Publication Data
US 2014/0291475 A1   Oct. 2, 2014

Related U.S. Application Data

(60) Provisional application No. 61/502,523, filed on Jun. 29, 2011.

(51) Int. Cl.
| | | |
|---|---|---|
| *F16M 13/00* | (2006.01) | |
| *F16M 13/02* | (2006.01) | |
| *E04H 9/02* | (2006.01) | |
| *E01D 19/04* | (2006.01) | |
| *E04B 1/98* | (2006.01) | |
| *F16F 15/02* | (2006.01) | |

(52) U.S. Cl.
CPC *E04B 1/98* (2013.01); *E04H 9/023* (2013.01); *F16F 15/02* (2013.01)

(58) Field of Classification Search
CPC ............. E04B 1/98; E04H 9/023; F16F 15/02
USPC ......... 248/580, 638; 52/167.5, 167.6; 384/36, 384/49, 610
See application file for complete search history.

(56) References Cited

U.S. PATENT DOCUMENTS

| 99,973 A | 2/1870 | Touaillon |
|---|---|---|
| 879,595 A | 2/1908 | Smith |

(Continued)

FOREIGN PATENT DOCUMENTS

| JP | S60226960 A | 11/1985 |
|---|---|---|
| JP | H1046867 A | 2/1998 |

(Continued)

OTHER PUBLICATIONS

Patent Abstract of Japan—Japanese Patent No. JP 10-068443 published Mar. 10, 1998 (English translation).

(Continued)

*Primary Examiner* — Anita M King
(74) *Attorney, Agent, or Firm* — Stout, Uxa & Buyan, LLP; Carlos A. Fisher

(57) ABSTRACT

Improved isolation flooring systems, and methods for their use are disclose for protecting a payload, such as heavy or delicate equipment (such as laboratory or computer equipment), from damage due to vibrations, such as seismic vibrations. In preferred embodiments, the invention is drawn to methods of isolating heavy and/or sensitive objects from the full acceleration of seismic vibrations.

26 Claims, 11 Drawing Sheets

(56) References Cited

U.S. PATENT DOCUMENTS

| | | | |
|---|---|---|---|
| 951,028 | A | 3/1910 | Schar |
| 1,761,659 | A | 1/1928 | Cummings |
| 1,761,660 | A | 6/1930 | Cummings |
| 2,055,000 | A | 8/1935 | Baciagalupo |
| 2,014,643 | A | 9/1935 | Bakker |
| 3,771,270 | A | 11/1973 | Byers |
| 4,188,681 | A | 2/1980 | Tada et al. |
| 4,371,143 | A | 2/1983 | Ishida et al. |
| 4,496,130 | A | 1/1985 | Toyama |
| 4,517,778 | A | 5/1985 | Nicolai |
| 4,662,133 | A | 5/1987 | Kondo |
| 4,718,206 | A | 1/1988 | Fyfe et al. |
| 4,801,122 | A | 1/1989 | Stahl |
| 4,881,350 | A | 11/1989 | Wu |
| 4,917,211 | A | 4/1990 | Yamada et al. |
| 5,081,806 | A | 1/1992 | Pommelet |
| 5,261,200 | A | 11/1993 | Sasaki et al. |
| 5,452,548 | A | 9/1995 | Kwon |
| 5,599,106 | A | 2/1997 | Kemeny |
| 5,689,919 | A * | 11/1997 | Yano .......................... 52/167.6 |
| 5,716,037 | A | 2/1998 | Haak |
| 5,816,559 | A | 10/1998 | Fujimoto |
| 5,934,029 | A | 8/1999 | Kawai et al. |
| 6,052,955 | A | 4/2000 | Haider |
| 6,092,780 | A | 7/2000 | Kurabayashi et al. |
| 6,123,313 | A | 9/2000 | Otsuka et al. |
| 6,164,022 | A | 12/2000 | Ishikawa et al. |
| 6,321,492 | B1 | 11/2001 | Robinson |
| 6,324,795 | B1 | 12/2001 | Stiles et al. |
| 6,505,806 | B1 | 1/2003 | Glaesener |
| 6,725,612 | B2 | 4/2004 | Kim |
| 6,955,467 | B2 | 10/2005 | Chang et al. |
| 7,290,375 | B2 | 11/2007 | Kemeny |
| 7,784,225 | B2 | 8/2010 | Kemeny |
| 7,785,225 | B2 | 8/2010 | Phillips et al. |
| 8,104,236 | B2 | 1/2012 | Kemeny |
| 8,156,696 | B2 * | 4/2012 | Hubbard et al. ............. 52/167.5 |
| 9,103,485 | B2 * | 8/2015 | Moreno ................. F16M 13/02 |
| 2002/0166296 | A1 | 11/2002 | Kim |
| 2005/0100253 | A1 | 5/2005 | Chang et al. |
| 2006/0260221 | A1 | 11/2006 | Kemeny |
| 2007/0220815 | A1 * | 9/2007 | Kemeny .................... E04H 9/02 52/167.3 |
| 2007/0261323 | A1 | 11/2007 | Hubbard et al. |
| 2011/0222800 | A1 | 9/2011 | Hubbard et al. |
| 2015/0101269 | A1 * | 4/2015 | Moreno ................. E01D 19/04 52/167.5 |

FOREIGN PATENT DOCUMENTS

| | | |
|---|---|---|
| JP | 10068443 | 3/1998 |
| JP | 2000240721 | 9/2000 |
| JP | 2002021917 | 1/2002 |
| JP | 2005030071 A | 2/2005 |
| JP | 2007009686 A | 1/2007 |

OTHER PUBLICATIONS

Patent Abstract of Japan—Japanese Patent No. JP 2000-240721 published Sep. 8, 2000 (English translation).

USPTO Office Action dated Nov. 24, 2009 in related U.S. Appl. No. 10/522,211 filed Apr. 4, 2006.

USPTO Office Action dated Jun. 22, 2009 in related U.S. Appl. No. 10/522,211 filed Apr. 4, 2006.

USPTO Office Action dated Nov. 10, 2008 in related U.S. Appl. No. 10/522,211 filed Apr. 4, 2006.

USPTO Office Action dated Dec. 16, 2010 in related U.S. Appl. No. 12/807,271 filed Aug. 31, 2010.

USPTO Office Action dated Jun. 7, 2011 in related U.S. Appl. No. 12/807,271 filed Aug. 31, 2010.

Letter regarding Japanese Office Action, issued on May 10, 2016.

* cited by examiner

SEISMIC ISOLATION SYSTEMS

This patent application claims priority to U.S. provisional patent application Ser. No. 61/502,523, filed Jun. 29, 2012, the disclosure of which is incorporated herein by reference.

BACKGROUND OF THE INVENTION

Earthquake tremors (and damage caused by such tremors) are the result of three basic types of elastic wave caused by the slipping of plates in the earth's crust against each other; two of these waves are capable of traveling through rock. The first of these three waves is the primary or P wave; this wave is a compression wave and propagates linearly in the direction of travel through rock and fluid; this is the fastest traveling seismic wave. The secondary or S wave generally moves more slowly than the P wave and its wave movement is at right angles (up and down, and/or side-to-side) to the direction of travel. It is the S wave that causes most damage to structures.

The third type of wave is called a surface wave, and is restricted to the ground surface. This type of wave has a motion similar to ripples on the surface of water. There are two types of surface waves. The first is called a Love wave and is similar to that of an S wave having a side-to-side motion with little or no vertical displacement; these waves can cause substantial damage to objects since virtually all the energy is employed within a horizontal plane. The second type of surface wave is called a Rayliegh wave, which is like an ocean wave and can cause displacement in both the vertical and horizontal plane relative to the direction of travel.

P and S waves have a characteristic which further affects shaking: when these waves move through layers of rock in the crust they are reflected or refracted at the interfaces between rock types. Whenever either wave is refracted or reflected, some of the energy of one type is converted to waves of the other type. For an example, as a P wave travels upwards and strikes the bottom of a layer of alluvium, part of its energy will pass upward through the alluvium as a P wave and part will pass upward as the converted S-wave motion. This means that the direction of shaking (e.g., left to right, front to back, or diagonally) in a given location is usually not entirely predictable, as it is dependent upon factors including the direction of wave travel and the nature (such as the density and homogeneity) of the crust in the general location in which the shaking is to be experienced. This in turn depends upon the location of the fault whose rupture has caused the waves.

Two approaches have been traditionally utilized to prevent or limit damage or injury to objects or payloads due to seismic events. In the first approach, used particularly with structures themselves, the objects or payloads are made strong enough to withstand the largest anticipated earthquake. However, in addition to the relative unpredictability of damage caused by tremors of high magnitude and long duration and of the directionality of shaking, use of this method alone can be quite expensive and is not necessarily suitable for payloads to be housed within a structure.

In the second approach the objects are isolated from the vibration such that the objects do not experience a major portion of the seismic waves. In certain cases, isolation flooring, for example "earthquake isolation flooring", has been used or proposed. Such flooring has generally comprised a combination of some or all of the following features: a sliding plate, a support frame slidably mounted on the plate with low friction elements interposed therebetween, a plurality of springs and/or axial guides disposed horizontally between the support frame and the plate, a floor mounted on the support frame through vertically disposed springs, a number of dampers disposed vertically between the support frame and the floor, and a latch to secure the vertical springs during normal use.

Certain disadvantages to such pre-existing systems include the fact that it is difficult to establish the minimum acceleration at which the latch means is released; it is difficult to reset the latch means after the floor has been released; it may be difficult to restore the floor after it has once moved in the horizontal direction; the dissipative or damping force must be recalibrated to each load; there is a danger of rocking on the vertical springs; and since the transverse rigidity of the vertical springs cannot be ignored with regard to the horizontal springs, the establishment of the horizontal springs and an estimate of their effectiveness, are made difficult.

Ishida et al., U.S. Pat. No. 4,371,143 have proposed a sliding-type isolation floor that comprises length adjustment means for presetting the minimum acceleration required to initiate the isolation effects of the flooring in part by adjusting the length of the springs.

Yamada et al., U.S. Pat. No. 4,917,211 discloses a sliding type seismic isolator comprising a friction device having an upper friction plate and a lower friction plate, the friction plates having a characteristic of Coulomb friction, and horizontally placed springs which reduce a relative displacement and a residual displacement to under a desired value. The upper friction plate comprises a material impregnated with oil, while a lower friction plate comprises a hard chromium or nickel plate.

Stahl (U.S. Pat. No. 4,801,122) discloses a seismic isolator for protecting e.g., art objects, instruments, cases or projecting housing comprising a base plate connected to a floor and a frame. A moving pivoted lever is connected to a spring in the frame and to the base plate. The object is placed on top of the frame. Movement of the foundation and base plate relative to the frame and object causes compression of the lever and extension of the spring, which then exerts a restoring force through a cable anchored to the base plate; initial resistance to inertia is caused due to friction between the base plate and the frame.

Kondo et al., U.S. Pat. No. 4,662,133 describes a floor system for seismic isolation of objects placed thereupon comprising a floor disposed above a foundation, a plurality of support members for supporting the floor in a manner that permits the movement of the floor relative to the foundation in a horizontal direction, and a number of restoring devices comprising springs disposed between the foundation and the floor member. The restoring members comprise two pair of slidable members, each pair of slidable members being movable towards and away from each other wherein each pair of slidable members is disposed at right angles from each other in the horizontal plane.

Stiles et al., U.S. Pat. No. 6,324,795 disclose a seismic isolation system between a floor and a foundation comprising a plurality of ball and socket joints disposed between a floor and a plurality of foundation pads or piers. In this isolation device, the bearing comprises a movable joint attached to a hardened elastomeric material (or a spring); the elastic material is attached on an upper surface of the ball and socket joint and thus sandwiched between the floor and the ball and socket joint; the bearing thus tilts in relation to the floor in response to vertical movement. The floor is therefore able to adjust to buckling pressure due to distortion of the ground beneath the foundation piers. However, the device disclosed is not designed to move horizontally in an acceleration-resisting manner.

Fujimoto U.S. Pat. No. 5,816,559 discloses a seismic isolation device quite similar to that of Kondo, as well as various other devices including one in which a rolling ball is disposed on the tip of a strut projecting downward from the floor in a manner similar to that of a ball point pen.

Bakker, U.S. Pat. No. 2,014,643, is drawn to a balance block for buildings comprising opposed inner concave surfaces with a bearing ball positioned between the surfaces to support the weight of a building superstructure.

Kemeny, U.S. Pat. No. 5,599,106 discloses ball-in-cone bearings. Kemeny, U.S. Pat. No. 7,784,225 discloses seismic isolation platforms containing rolling ball isolation bearings. Hubbard et al., U.S. Patent Publication 2007/0261323, filed on Mar. 30, 2007 discloses a method and raised access flooring structure for isolation of a payload placed thereupon. Isolation bearings are disclosed in U.S. patent application Ser. No. 13/041,160 filed on Mar. 4, 2011, and Moreno et al., International Patent Application No. PCT/US11/27269, filed on Mar. 4, 2011.

All patents, patent applications and other publications cited in this patent application are hereby individually incorporated by reference in their entirety as part of this disclosure, regardless whether any specific citation is expressly indicated as incorporated by reference or not.

SUMMARY OF THE INVENTION

The present invention is directed to vibrational isolation components, preferably of industrial guage, for aiding in the prevention of personal injury, equipment operating inefficiencies, and/or property damage due to displacement of industrial structures, heavy structures or valuable, expensive, and/or delicate objects and equipment (including, for example, computer equipment such as servers and hard drive arrays) during a seismic tremor or other vibration eliciting event.

The equipment supported by this system may comprise, without limitation, industrial manufacturing, processing, or packaging equipment; assembly line components; computer components such as mainframe computers, computer components of robotic or semi-robotic equipment; electrical equipment such as dynamos and the like; laboratory and hospital equipment; hazardous chemical storage cabinets (thus preventing possible injury, explosion, fire, and the like); art works (such as, without limitation, sculptures and paintings); machinery; people; and the like. Collectively, the materials, objects and structures to be protected against damage or injury by the instant seismic isolation system will be referred to herein as the "payload".

The present invention thus provides heavy duty industrial vibrational isolation or flooring systems to attenuate or reduce the amount of vibrational energy or acceleration experienced by payloads. By "reducing" the vibration, vibrational energy, acceleration or displacement experienced by a payload is meant that such reduction is relative to that vibration, vibrational energy, acceleration or displacement experienced by an unisolated payload.

Preferably the isolation system described and claimed herein, while supported by a foundation, slab (such as a cement or concrete slab or pad), or floor, is not a "raised" flooring system in the usual sense of the term, in that the preferred isolation system is not designed to provide access space under the support plate to create a hidden void for the passage of mechanical and electrical services such as cooling or heating systems, equipment connections such as power or data cables or conduit. Accordingly, unlike other systems that have been described, the current system is not designed using an underfloor substructure of adjustable-height or fixed supports or pedestals upon which the flooring rests. The term "pedestal" as used herein means an upward or downward projecting column, for example, of greater than about 6 inches, or of about 12 inches, or about 18 inches or about 24 inches or more, having an attached isolation bearing half (either upward- or downward-facing) joined at an end thereof and creating an access space under the support plate.

By "foundation" is meant a base upon which the bottom portion of the isolation system of the present invention rests which is suitably strong enough to firmly support both the claimed industrial isolation system and the payload. Although not always the case, in one preferred embodiment the foundation upon which the isolation system is supported is positioned lower than the plane of the surrounding floor or base, such that a support plate or panel upon which the payload is placed is at substantially the same level or plane as the surrounding floor or base. In particularly preferred embodiments the foundation comprises or is comprised within a recess or a trench having a level lower than that of, and parallel to, the plane of surrounding floor or base.

In a salient feature of the invention, the isolation system comprises or is supported by a strong frame (for example, a heavy duty frame using girder sections such as I-beam sections) upon which the bottom surface of a horizontal support plate or panel is installed and joined. The top surface of the support plate accommodates the payload to be isolated. The support plate is fabricated to have a high degree of integral strength, and to be resistant to bending or breaking under load. For example, the support panel or plate may be wholly or partially fabricated of one or more metal sheets. Alternative or additional materials comprising the support panel may include metal struts or beams, carbon fiber composites, fiberglass, wood, concrete, thermopolymers and thermopolymeric composites and the like. Although generally solid, the support plate or panel may in certain embodiments comprise an opening, for example, a grated or honeycomb-type structure, to reduce the weight without substantially sacrificing structural strength.

The frame supporting the support panel or plate is in turn supported on the foundation, (e.g., concrete slab or pad) by a plurality of isolation bearings, each such bearing comprising a cavity defined by opposing recessed upper and lower bearing surfaces separated by and containing at least one rigid spherical ball. The weight of the payload on the isolation system is borne by these bearings comprising at least one concave or conical surface, each such bearing comprising a ball. Preferably the bearing is a ball-in-cone bearing or comprises a bearing surface comprising different cross-sectional shapes. The specific way in which the system is adapted to support the payload is subject to any of a number of variations, all such variations being encompassed within the present invention.

In particularly preferred embodiments the cross-sectional outline of the bearing surface cavities comprises a composite shape containing at least one linear region. In other embodiments the cross-sectional outline of the bearing surface cavities comprises a composite shape containing at least one curved region. In the most preferred embodiments the cross-sectional outline of the bearing surface cavities comprises a composite shape containing at least one linear region and at least one curved region.

The present isolation system is made to bear payloads ranging from several hundred pounds to several tons or more. In preferred embodiments the isolation platform is sufficiently strong to bear payload masses of a ton or multiple tons, or ten tons or more. By "payload masses" or "payload weight" is meant the combined mass of all objects placed upon the isolation system at one time.

The payload generally comprises industrial equipment, such as manufacturing equipment, product processing equipment, packaging equipment, computer equipment such as servers and hard disk arrays, and/or the like. The payload may additionally or alternatively comprise structural components of a building or other such structure or part thereof.

The invention is useful in the field of structural support and seismic stabilization, such as for payloads comprising heavy structures, buildings, bridges, and other large edifices. In presently preferred aspects, the invention is useful for supporting and stabilizing individual equipment, such as manufacturing, laboratory, computer, product processing and/or packaging equipment, computer equipment, and/or other valuable equipment from vibrations, including but not limited to seismic vibrations, which might otherwise damage such equipment.

As indicated previously, a foundation may exist at a level other than a ground level. Without limiting the scope of the invention, often the foundation will comprise or be built upon a continuous concrete or other slab at a ground level of a structure or may be raised above ground level on a pad; in other embodiments a foundation may include a recess in the base or floor level so that the horizontal support panel indicated above may be substantially level with such base or floor level, as described further herein. The base or floor level may include a preexisting floor or slab or custom-made floor or slab, and this floor may be present at a ground level, below ground level, or a second or higher storey level of the building it is contained within.

Thus in one preferred embodiment, the present invention comprises a seismic isolation system for supporting a payload comprising a seismic isolation system for supporting a payload comprising: a) a horizontally oriented support panel having a top surface and a bottom surface, wherein said support panel is structured to support the payload placed on the top surface thereof; b) a rigid frame joined to the flooring panel and structured to support said flooring panel and payload; c) a plurality of downward-facing isolation bearing halves joined to the bottom side of said first frame, wherein each downward-facing bearing half comprises a downward-facing recessed bearing surface; d) a plurality of seismic isolation footplates, each footplate comprising a upward facing bearing half comprising a recessed upward-facing bearing surface wherein each of said footplates is securely joined to a foundation and the upward facing recessed bearing surface of each of said footplates opposes a second, downward facing recessed bearing surface of a corresponding downward-facing bearing half and defines a cavity therebetween; e) at least one rigid ball located in each of such said cavities, said ball being structured to be sufficiently strong to maintain a gap between downward and upward-facing bearing halves during operation; and wherein, in the event of a seismic vibration each seismic bearing half moves relative to its corresponding opposing footplate thereby cushioning the payload from the full force of said seismic vibration.

In one embodiment, the horizontal support panel comprises either a single panel sheet or a plurality of panel sheets. In this embodiment, the sheet may comprise one or more opening to reduce the mass of the panel, or it may be solid. The support panel may comprise a substantially homogenous material or mixture of materials, or may comprise layers of different materials (or mixtures of materials), such as in a laminate. Without limitation for example, the support pane may comprise one or more layers of any or each of a metallic alloy, wood, thermoplastic, glass wool, polymeric resin, carbon fiber and/or similar materials thus giving the support panel a high degree of strength and structural integrity—preferably while maintaining the mass of the support plate conveniently low.

In a preferred embodiment of the present invention, the frame comprises a network of rigid, criss-crossing elongate support members and wherein each of the plurality of downward facing seismic isolation bearing halves is joined to the bottom side of the frame at an intersection of the elongate members. In an important, and preferred embodiment, the frame is made of structural members (such as I-beam segments) that are able to be connected in many ways, so that the isolation system of the present invention may be tailored to fit the required space and accommodate varying sizes and weights of payload to be isolated. I-beam segments are generally at least partly metallic, and may comprise iron, aluminium, titanium, carbon, tin, copper and/or various metal alloys such as steel.

In a preferred embodiment, the frame is bolted to the bottom surface of the flooring panel. In another embodiment the frame may be welded to the bottom surface of the flooring panel.

Seismic isolation bearings of the present invention comprise two generally identical recessed bearing surface halves: an upward facing recessed bearing surface comprised in or joined to a footplate, and a downward-facing bearing surface joined to the frame described above. Isolation bearings that are used to protect a payload from damage due to seismic vibration are typically configured to support an approximate minimum load, i.e., the weight of the structure being supported.

In this regard, in certain embodiments it may be desirable that the rigid ball within the seismic isolation bearing be prevented from rolling out of the bearing during a particularly strong tremor in order to prevent failure of the bearing or damage to the payload being supported. Thus, in one embodiment of the present invention, at least one, and preferably both of the upward-facing and downward-facing recessed bearing surfaces has a circular rim adapted to prevent movement of said rigid balls out the corresponding cavities. In a preferred embodiment, the circular rims of each of a pair of upward and downward facing recesses do not contact each other in the resting position, when there is no seismic vibration. The lack of contact prevents frictional forces from being generated by the isolation bearing halves' movement relative to each other during use.

The seismic isolation bearings of the present isolation system, with each bearing utilizing at least one rigid ball within a cavity formed within opposing upward and downward-facing recessed load bearing surfaces.

The conservative character of the "rolling ball" type of isolation bearing of the present invention may be described in terms of the bearing's ability to absorb and store displacement energy caused by seismic activity or other external applied forces, thus cushioning the payload being supported from damage due to such displacement. It will be understood that such a rigid ball may itself be referred to as a bearing (such as a ball bearing), or the combination of the rigid ball and the supporting recessed bearing surface may together be referred to as a bearing. In this description generally the word "bearing" shall be reserved for the entire assembly; however, in certain occasions the context may make clear that the rigid ball itself is referred to as a bearing, such as through the use of terms such as "ball bearing", "rolling bearing" or "spherical bearing".

The rigid balls are generally made of metal, such as stainless steel, but may be made of any sufficiently rigid material, including a polymer such as a plastic, a hard rubber, and the like. Those of ordinary skill in the art will be aware that a hard, rigid ball, such as a stainless steel ball, making contact with a bearing surface of similar rigidity, will make contact at a single point (thus at two points within the cavity of opposing recessed bearing surfaces), thereby having a minimum of energy lost to friction.

Alternatively, if a measure of dampening is desired, one or more ball and/or one or more bearing surface may be made to have an increased coefficient of friction (such as with a surface coating of a pliable rubber, plastic or the like; or by making all or part of the ball or bearing surface out of such a dampening material).

In one specific embodiment, the presently claimed invention comprises seismic isolation bearings in which the mass of the payload or a portion thereof is concentrated on a plurality of rigid balls placed between the upward-facing and downward-facing recessed bearing surfaces, at least one of which has a cross-sectional shape comprising at least one of an arc, a constant slope, or a parabola; preferably the cross-sectional shape comprises and at least two different curves or lines. Thus, in one embodiment of the present invention, the upward-facing and downward-facing recessed bearing surfaces are partially conical in shape. In a preferred embodiment, at least one of the upward-facing and downward-facing recessed bearing surfaces has a cross-sectional shape comprising a combination of conical and spherical shapes; a composite shape. In a preferred embodiment, the upward-facing recessed bearing surface may be identical to the downward-facing recessed bearing surface, but have an inverted orientation.

Isolation platforms containing a variety of differently shaped load bearing surfaces bearings are disclosed in e.g., Kemeny, U.S. Pat. No. 5,599,106; 7,784,225 and US Patent Publication 2006/0054767; Isolation platforms comprising floors are disclosed in e.g., U.S. Pat. No. 7,290,375 and U.S. Patent Publication 2007/0261323. Each of these publications and patents, and every other patent, patent application, and publication cited in this patent application, is expressly and individually incorporated by reference herein in its entirety as part of this specification.

Thus, in preferred embodiments of the present isolation system, the plurality of bearings of the "rolling ball" type including a plurality of identical upward-facing and downward facing opposed recessed bearing surfaces having, without limitation, a wholly or partially conical, spherical or parabolic shaped cross-sectional shapes and forming a cavity (preferably one having a region of constant slope) with a rigid ball-shaped bearing placed therebetween. The footplate comprising the upward facing recessed bearing surface rests or is preferably securely fixed to the ground or foundation, while the payload to be supported rests on or is joined to the top surface of the horizontal support panel, which in turn is joined to the frame comprising the isolation bearing halves comprising the downward facing recessed bearing surfaces. Rigid balls are contained in the cavities formed by opposing downward facing recessed bearing surfaces and upward facing recessed bearing surfaces. In this way, when external vibrations such as seismic movements occur causing the ground to move, the footplates are able to move relative to the upper bearing halves via the rolling of the rigid balls within the cavities defined by opposing opposing downward facing recessed bearing surfaces and upward facing recessed bearing surfaces. The inertia of the payload causes the payload supported by the present system to be thus isolated from the external vibrations.

However, depending on the size of the seismic vibration, the bearings may have a limited range of mobility, and thus be able to absorb and dissipate a limited range of severity of seismic shock before becoming less effective. For example, the maximum amount of lateral displacement of the upper bearing halves and footplates relative to each other may be limited based on the size of the bearings or of the surrounding structure, building or room within which the present isolation system is contained. Also, in isolation bearings and platforms containing rolling balls, a severe shock such as that caused by a strong seismic tremor, could cause such severe lateral displacement of a rolling ball type isolation bearing that the ball is ejected from the bearing, causing failure and potential damage to the payload.

There is a need for seismic isolation bearings that are stable (i.e., have a reduced tendency to fail), can withstand and absorb large seismic shocks, and which are easily integrated into the locations in which they are desired to be installed. There is also need for isolation bearing structures that have reduced susceptibility to resonance or harmonic interactions between bearings, spheres, and bearing surfaces during a vibration. Such interactions may be caused when bearing surfaces are substantially discontinuous (for example in which the load-bearing surface has radial grooves or crests) or when, for example, a central apex is too deep. In such structures, when the bearing is subject to a strong vibration, the spheres may "bounce" in and out of the apex, over or through the groove or ridge, or cause a shaking of the bearing when it interacts with other isolation bearings in, for example, an isolation platform.

Isolation bearing stability may be improved by factors including increasing the size of the bearing surfaces, by increasing the depth of the recess on the bearing surface of one or more downward-facing bearing halves and upward-facing footplates, and/or by varying the shape of the bearing surfaces. Thus, in accordance with an embodiment of the present invention, the diameter of each of the upward-facing and downward-facing recessed bearing surfaces is between about 8 inches and about 36 inches or more. Preferably the diameter of the recessed bearing surfaces is about 8 inches, or about 12 inches, or about 15 inches, or about 20 inches, or about 24 inches, or about 30 inches or about 36 inches.

The geometry of the load-bearing surface is of particular relevance when considering the forces acting upon the bearing during and after it is subjected to a vibration, such as a seismic vibration. As indicated elsewhere herein, generally, in accordance with various embodiments of the present invention, the bearings of the present invention may comprise recessed bearing surfaces having a combination of two or more different cross-sectional shapes, such as, without limitation, conical depressions, spherical depressions, and/or parabolic depressions. Within limiting the scope of the invention, in a preferred configuration the load-bearing surfaces of the dishes do not comprise ridges or groove-like depressions radiating substantially from the center of the dish or in any other direction, although there may be annular concentric regions of discontinuity between cross-sectional shapes.

In one embodiment, the stability of the bearing, isolation system is also increased through the size of its "footprint" (its width versus its height) as compared to the center of gravity and weight distribution of the payload.

Optionally, in certain embodiments flexible straps between and linking the upper bearing halves and lower footplates may be attached, thereby allowing lateral displacement between the bearing plates, but preventing their unwanted complete separation. In addition to, or instead of these straps, one or more isolation bearing restraint, for example those found in Moreno & Hubbard, U.S. patent application Ser. No. 12/567,548 (hereby incorporated by reference herein in its entirety) may also be used, thereby freely permitting lateral displacement of the bearing due to the rigid/rolling spheres between the bearing surfaces while simultaneously substantially preventing bearing failure due to unwanted separation of the bearing plates and/or ejection of the rigid balls from between the upper bearing halves and lower footplates.

With respect to the upward-facing recessed bearing surface halves, in a further embodiment of the present invention, the seismic isolation system may comprise a rigid, second frame; this second frame may, but need not, be a mirror image of the rigid first frame; the bottom of the second frame is joined to a floor or foundation (for example, by bolts) and comprises a network of rigid criss-crossing elongate members wherein the second frame is joined on its upper side to each of the plurality of upward-facing recessed bearing surface halves, preferably at the intersection of the elongate members. While the upward-facing recessed bearing surface halves may be comprised in a footplate, in other embodiments of this general design the upward-facing recessed bearings may be substantially identical to the downward-facing recessed bearing surface halves.

In another embodiment of the present invention, each of the footplates is placed in a recess in a floor or foundation and thereafter joined to the floor or foundation, for example with bolts.

In a particularly useful embodiment, in the present system, each of the footplates is secured to a recess in the foundation in a manner causing the top surface of the horizontal flooring panel to be substantially level with and parallel to the foundation. The recess is adapted to include a gap or void between the isolation system and the foundation to permit and accommodate the necessary movement of the horizontal support panel, payload, first frame and downward-facing bearing halves in response to a seismic vibration of the foundation. Additionally, when the payload comprises equipment requiring electrical, computer, gas or other connections, flexible lines, hoses and/or conduit supplying such connections may be provided on the foundation side of the gap or from the ceiling ton the equipment; the flexible connection permits movement during a seismic tremor and the maintenance of the connection.

In a particularly preferred embodiment, the gap or void may be used

In particular embodiments of the isolation systems of the present invention the recessed bearing surfaces comprised within separate upper bearing halves and lower footplates are affixed to the bearing halves and footplates using any effective method suitable to withstand the stresses of a seismic event, such as using nuts and bolts, welding, or by any other sufficiently hardy method of affixing. The bearing halves and footplates themselves are comprised of a rigid material such as steel, a metal alloy, or a sufficiently rigid and strong polymer having a hardness to resist buckling, twisting and similar stresses expected to be encountered in a seismic event. Preferably, the bearing halves and footplates are made of ½ to ¼ inch steel.

The bearing halves are in turn joined to the frame (and the footplates to any second, bottom frame comprising the upward-facing bearing surfaces or to the foundation, flooring or slab, respectively) using any suitable method, including but not limited to welding, bolts, cementing, embedding in concrete, and the like. The horizontal support panel is joined to the upper side of the frame using welding, bolts, ceneting, or similar suitable methods. The support panel may be a single construction or comprise a composite of a plurality of smaller panels used in combination to create the horizontal support panel that serves not only to support the payload but is also joined to the frame.

The horizontal support panel(s) to be used in the isolation system of the present invention may comprise any appropriate material (including metal, fiberglass, plastic, plywood, wood or composite materials, or any combination of such materials). The support panel itself may comprise, for example, a plurality of reinforced geometrical panels, such as quadrilateral panels, or panels of regular shape that are substantially interchangeable; for example, rectangular panels of a standard size. In certain embodiments a particularly advantageous size is a 2 foot square panel. In a typical embodiment, these panels or groups thereof are supported (for example, supported at least at each corner) on their bottom side by the rigid frame in a grid- or matrix-like arrangement. While in most (and all preferred) embodiments the isolation systems of the present invention do not comprise raised access isolation floors, in some, less preferred embodiments cases certain panels may be modified to comprise access apertures through which, for example, cables, hoses, wires, network connections, conduit, and/or other materials may be fed for connection with the payload objects. In addition, the support panel and/or frame are often useful in permitting lines, such as electrical, heating, cooling and/or data lines, to be distributed within a room or workspace without the need for such lines intruding on support panel itself.

In a presently preferred embodiment of the invention, the horizontal support panel is first stably supported by a frame made of material sufficiently strong to support the weight of the objects to be placed upon the flooring. Examples of useful framing material include, without limitation, steel, aluminum, titanium, iron, bronze, polymeric materials, alloys of these materials and the like. Preferably, the material is sufficiently lightweight to permit facile assembly and disassembly of the frame in situ, and to keep the overall load upon the bearings to a minimum. In preferred embodiments frame members may comprise steel or other alloys in the form of girders or I-beams.

The frame may be constructed using frame members arranged in any manner (often in a reinforcing polygonal arrangement) giving the frame sufficient structural support to adequately support the objects to be placed on it and to resist buckling during a seismic event. Since most locations into which the present system is installed are likely to be rectangular, the frame members may commonly be arranged in a generally quadrilateral manner, such as the framing shown in FIG. 5 of this specification. However, other arrangements are possible including frame members arranged in triangular fashion, either in planar or tetrahedral fashion, or in other geometrical shapes that lend the frame its strength.

In yet other embodiments, the frame may comprise the foundation of a structure, such as a shipping container, mobile home, or a structure made in a similar manner as a mobile home.

The rigid ball(s) to be used in the isolation bearing cavity is preferably a rigid, uncoated hardened steel ball bearing, although rubber or elastomer-coated balls, synthetic balls and the like may be exclusively utilized, for example to provide a measure of dampening, in less preferred embodiments. Additionally, a combination of uncoated, low friction balls may be used in combination with a number of coated, higher friction rigid balls, with the latter ball type acting as a damper to absorb energy by friction and the mix of coated and rigid balls tailored to the specific payload mass and situation. The ball may comprise stainless steel, or any hard metal, metal alloy, or (in the case of damping balls), hardened polymeric material that is able to support a weight of at least about 1000 lb without substantial deformation, or any deformation.

Additionally, the isolation system of the present invention comprises a plurality of bearing halves and footplates, preferably sufficient to stably support the flooring without substantial movement except in the event of a seismic vibration. For a quadrilateral floor, this generally means at least one such bearing half (with a corresponding footplate to pair with) will be typically placed at or near each of the four corners of the rigid frame (or flooring if the floor is independently reinforced. Also additional bearing halves may be placed in other locations in a manner preventing the frame from sagging or buckling, with due account being taken for the load tolerance of each individual bearing (e.g., 1000 lbs or more) and the total foundation or pad load and distribution thereof, when calculating the total number and distribution of bearings to be utilized. The bearing halves may make up a matrix of paired bearing halves and footplates across the floor or foundation of the isolation system.

The present invention also encompasses methods for isolating an industrial payload from a seismic vibration comprising placing or assembling a payload on, or joining a payload to, a seismic isolation system described herein.

DETAILED DESCRIPTION OF EXEMPLARY EMBODIMENTS

Figure 1:
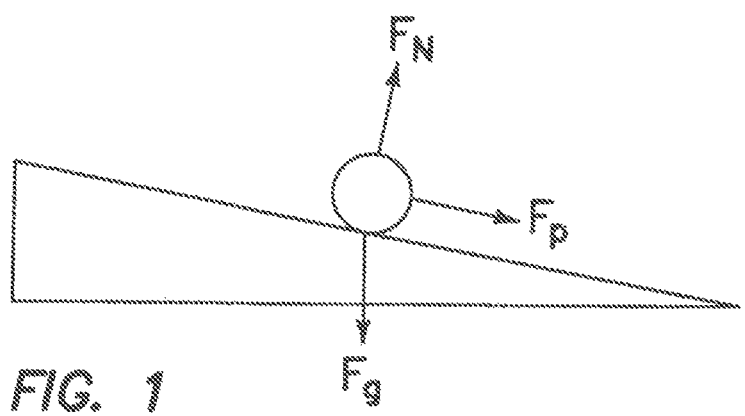
FIG. 1 is a drawing showing the force vectors upon a rolling rigid ball on an inclined plane.

In one embodiment of the isolation system of the present invention, FIG. 1 is described below with reference to a ball-and-cone type rolling ball bearing. The ball-in-cone bearing may be used as an initial (and non-limiting) illustration of the relation of geometry and the physical principles at play in rolling rigid ball isolation bearings. The ball rests between the upper/downward-facing and lower/upward-facing recessed bearing surfaces, and in certain cases may rest in central apices or depressions of one or both such bearing surface. Upon the application of a lateral force, there may be desired some initial resistance to displacement of the ball from these depressions. The resistance may be made sufficient to prevent any substantial displacement of the two bearing surfaces with respect to each other if the applied lateral force is too small. Thus, where present, the spherical shape of the central apices provides an initial restoring force urging the ball to remain within the central apex. This restoring force is identical regardless of the direction from which the lateral force is applied.

Regardless whether the bearing possesses central apices or not, if the initial lateral force is great enough, the bearing halves and footplates of the bearing will be moved relative to one another by the applied force through the action of the rigid/rolling ball. This means that the applied lateral force is strong enough to force the ball along the preferably at least partially conical recessed surface. This requires that either the upper/downward-facing recessed bearing surface or the ball (or both) move "uphill" against both the force of gravity and the mass of the load placed on the upper bearing halves of the claimed seismic isolation system. Therefore, the lateral force is temporarily partially stored as vertical "potential energy".

If the bearing surface is at least partially conical, the cross-sectional view of the bearing surface will have at least a portion that is linear. Once the ball is located on linear portion of the second/upward-facing recessed bearing surface, the physics are similar to an object placed on an inclined plane, since in a ball-in-cone bearing the second/upward-facing recessed bearing surface has at least a region of constant slope. For simplicity, FIG. 1 examines primarily the lower recessed surface and the ball, with the understanding that similar principles apply (although in mirror image) to the upper recessed surface, which "floats" upon and is supported by the rolling ball.

Thus, with reference to FIG. 1, Fg equals mg, where m is the combined mass of the ball and the load transferred upon the ball by the upper plate, and g is gravitational acceleration (9.81 m/s$^2$). Although Fg is exerted downwards, on the inclined plane, Fg is comprised of two vectors: FN (the normal force extending perpendicular to the surface of the plane)

and Fp. Due to the shape of the ball, the force opposing Fp (Ff; the frictional force) is minimal and therefore disregarded in this diagram.

The magnitude of each of the vectors Fp and FN is dictated by the angle of the inclined slope and the magnitude of Fg, and can be calculated geometrically from the Pythagorean theorem, where $Fg^2=FN^2+Fp^2$. Thus, Fp is a constant, so long as the angle between the recessed surface and the horizon is also constant.

Therefore, once the lateral motion has caused the ball to displace onto either or both the upper or lower recessed bearing surface, Fp, the "restoring force" is constant because of the conical nature of the ball-in-cone surface.

With this explanation, it can now be seen that if the bearing surface has a region of a different cross-sectional shape (e.g., a shape of a spherical curve) such that vertical displacement as a function of lateral displacement is not constant, the magnitude of the restoring force Fp as a function of lateral distance traveled by the rolling ball in this region is also not constant.

For example, if one imagines for a moment that the cross-section of the bearing surface, or a region thereof, is a spherical curve rather than conical. In such a bearing surface a radius through the center of the bearing surface to the perimeter of the bearing surface viewed in cross-section would yield a non-constant, curved slope.

Thus, a restoring force Fp is not be constant if the cross-section of the recessed surface is any other shape than a straight line (meaning that the shape of the bearing surface is at least partially conical). Rather, the restoring force (and vertical distance traveled by the ball) would increase as a function of the distance the ball travels from the center of the bearing (i.e., toward the perimeter of the bearing surface, where the steepness of the slope of the curve increases). In a spherical curve, the rate of change of the restoring force is constant, but not the restoring force itself. Thus, with each unit of lateral distance traveled from the center of the bearing surface, the greater the vertical distance traveled and the greater the restoring force.

Other simple planar open curves (such as various parabolic or other concave curves) have the same basic character as the spherical curve, so that as the ball moves from the center of the bearing towards the perimeter of the bearing surface the change in vertical displacement as a function of lateral distance traveled increases at different non-constant rates depending upon the shape of the curve.

In the present invention it has been surprisingly found that an optimal configuration for the recessed load-bearing surface of a rigid/rolling ball isolation bearing, particularly when the isolation bearing is subjected to a strenuous vibration and is used in conjunction with other isolation bearings (such as in an isolation platform, track, or floor), is a combination of more than one shape. In a preferred embodiment, when viewed in cross-section, at least one (and preferably both) of the upper and lower load-bearing surface has an enlarged concave indentation at the center, with a border around the perimeter of the bearing comprising a region of constant slope, as in a conical bearing.

In another preferred embodiment, the present inventors have discovered that a rigid rolling ball isolation bearing tends to perform more robustly, and will be subject to less disruptive harmonic resonance, if either or both recessed load-bearing surfaces lack a central spherical depression having approximate diameter of the rolling ball, or have a very shallow depression in the center.

Preferably the shapes of the curve and angle of the cross-section of each load-bearing recessed bearing surface or "dish" are such that regardless of the input shear acceleration caused by the seismic event, the output is limited to a maximum acceleration. For example, in one embodiment of the invention, the output acceleration may be limited by the combined curve and angle of the dish to about 0.1 g or less, even when the input shear is about 0.3 g, or about 0.35 g, or about 0.4 g, about 0.5 g, or about 0.6 g, or about 0.7 g, or about 0.8 g, or about 0.9 g, or about 1.0 g or more.

In another embodiment the output acceleration may be limited by the combined curve and angle of the dish to about 0.8 g or less, even when the input shear is about 0.3 g, or about 0.35 g, or about 0.4 g, about 0.5 g, or about 0.6 g, or about 0.7 g, or about 0.8 g, or about 0.9 g, or about 1.0 g or more.

In another embodiment the output acceleration may be limited by the combined curve and angle of the dish to about 0.75 g or less, even when the input shear is about 0.3 g, or about 0.35 g, or about 0.4 g, about 0.5 g, or about 0.6 g, or about 0.7 g, or about 0.8 g, or about 0.9 g, or about 1.0 g or more.

The attenuation of the input shear forces are a function of the base shear input. Thus, the percentage attenuation can be up to about 66%, or up to about 71%, or up to about 75%, or up to about 80%, or up to about 83%, or up to about 86%, or up to about 88%, or up to about 90% or more.

It will be understood that the ranges of input shear, output shear and percentage attenuation presented above specifically disclose, and are intended to specifically disclose, all points between any two maximum and minimum values listed and any range from a value greater than 0 and up to any such maximum value listed.

Preferably, although not necessarily, the upper/downward-facing recessed bearing surfaces in the bearing halves and/lower/upward-facing recessed bearing surfaces in the corresponding footplates are substantially alike, or identical, in their opposing surfaces. In such seismic isolation systems, or bearings or platforms the upper bearing half supports the one or more loads, and the footplate directly or indirectly contacts the floor, foundation, surface or area below the bearing or platform. Between each bearing comprising upper and lower recessed bearing surfaces, at least one rigid, spherical rolling ball is placed within the cavity formed from opposing, recessed composite bearing surfaces, thereby allowing the upper bearing half and lower footplates to displace relative to one another by rolling on the balls.

As lateral forces (e.g., in the form of seismic vibrations) are applied to the bearings, the upper bearing halves are displaced laterally with respect to the lower footplates, such that the rigid balls therebetween roll and rotate freely in any direction and, if sufficiently hard and rigid and lacking in dampening, in an almost frictionless manner about their respective depressions or cavities. The ball or balls permit the bearing to store the energy of the vibration as potential energy by being raised to higher elevations along the bearing surface, such that, the ball(s) remain in contact with the upper and lower bearing surfaces and the upper and lower bearing surfaces thus remain indirectly in contact with each other. Due at least in part to the conical, spherical, parabolic, or other raised shapes of the first and second composite bearing surfaces, the gravitational forces acting on the payload or structure, and the structure's mass, produce a lateral force component tending to restore the seismic isolation system, isolation bearing or platform to its original central position, with the upper bearing halves being positioned substantially directly above the lower footplates.

Figure 2:
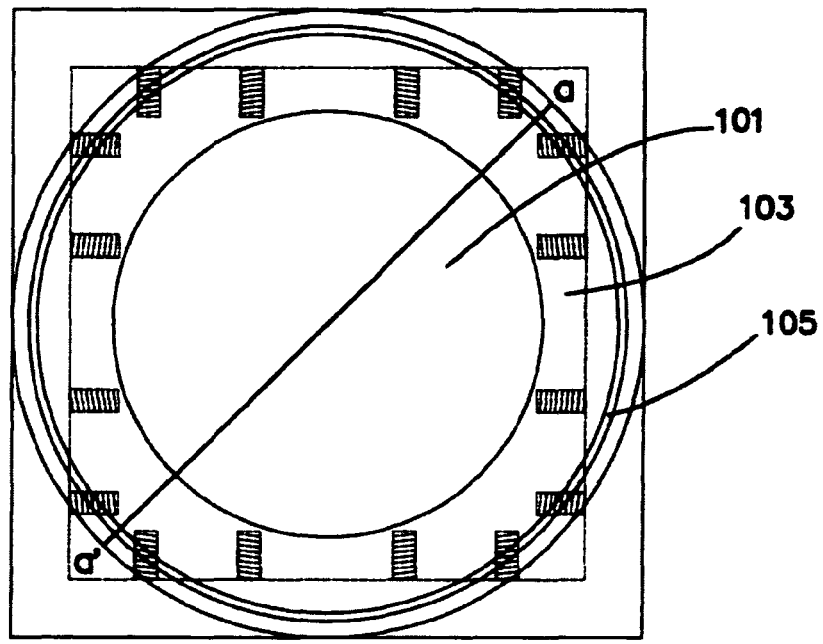
FIG. 2 is a top view of an embodiment of a recessed bearing surface of a footplate having a composite bearing surface, as described in an embodiment of the present invention.

FIG. 2 shows a preferred composite bearing surface used in an embodiment of the footplate of the seismic isolation system of the present invention. In this figure, the load-bearing portion of each footplate of the plurality of footplates/dishes (only a single footplate is shown) comprises, in a top view, a substantially circular load-bearing recessed surface having a concentric central region 101 comprising a curved cross-sectional region, such as a spherical curve, and an annular region 103 ringing the central region and comprising a flat, sloped surface linking the central region 101 with a raised lip 105 at the perimeter of the circular load bearing region. Preferably, the central region 101 does not comprise a central dimple for the rigid ball to rest within when the footplate bearing is not subject to shear forces. However, in other embodiments the footplate bearing surface may contain a central dimple for the rigid ball to rest within when each of the plurality of footplate bearings are at rest.

Still with reference to FIG. 2, in a preferred embodiment, the ratio, in a line segment extending from point a to point a', of the diameter of the central region 101 to the remainder of the load-bearing surface (the annular region 103 and lip region 105), is about 2 to 1. Thus, in a preferred embodiment where the dish is between about 8 inches to about 48 inches in total diameter, a dish having this ratio has a central region diameter of about 5.3 inches to about 32 inches, with the annular region (which is passed through twice by the line segment) having a width of about 1.3 to about 8 inches. The majority of this annular region (about 1.625 inches to about 6.5 inches) is the flat, sloped surface, with the raised lip comprising about 0.375 inches to 1.5 inches of the 1.3 inch to 8 inch annular region.

Figure 3:
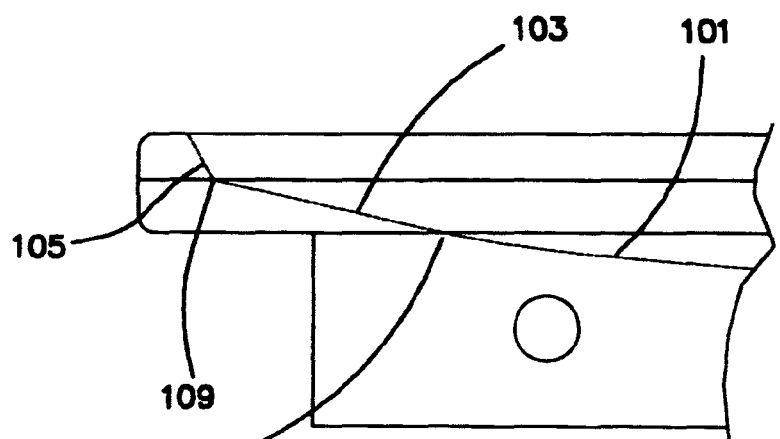
FIG. 3 is a side view of the recessed bearing surface shown in FIG. 2, of the edge of the recessed bearing surface of a footplate as described in an embodiment of the present invention having a composite bearing surface.

FIG. 3 shows the perimeter portion of the sameembodiment of the composite-shaped bearing surface of the footplate component of the present isolation system invention shown in FIG. 2, but this time in cross-section. In one example of a footplate, as shown, the border 107 between the central, spherically curved region 101 and the flat, linear-sloped annular region 103 is shown, with an approximately 1.6 inch length of this latter flat region, rising 0.25 inches with a constant slope equaling about 0.25/1.6 or about 0.156. The border 109 between the substantially flat, sloped annular region 103 of the footplate/dish and the lip 105 is shown, with the lip rising in a substantially constant slope. In this embodiment, the slope is: approximately 0.25 inches of vertical rise in approximately 0.125 inches of horizontal length, or approximately 2:1. The lip becomes horizontal for about 0.25 inches before reaching the edge of the plate. In this case, the central, spherically curved region 101 has a radius of curvature of about 86 inches, meaning it corresponds to an arc of a circle having a radius of about 86 inches.

Those of ordinary skill in the art will immediately recognize based on the foregoing, that the embodiment described above is only one of various possible embodiments of composite bearing surfaces that may be used in the present invention. In particular, the exact curvature of the central, spherically curved region 101 may be varied (for example, to a parabolic shape) without departing from the spirit of the invention.

It will be recognized, based on this disclosure, that the design of the composition bearing surface depicted in FIG. 2 and FIG. 3 may serve to provide somewhat greater restoring forces in less violent earthquakes or vibrations. Additionally, the total horizontal displacement will be less than would otherwise be the case with solely a conical load-bearing surface in stronger earthquakes. Where the vibration is strong enough to cause the rolling ball to cross border 107, then the restorative force does not continue to increase as the rigid ball travels up the flat, sloped annular region 103, thereby helping to prevent excessive rocking of the bearing (or the payload placed upon the bearing) when the upper bearing half seeks to return to equilibrium after the vibration has subsided.

In certain embodiments, the lack of a small central spherically curved dimple or recess also contributes to a more smoothly operating isolation bearing during a strong vibration. Without such a recess the bearing is less likely to fail or be damaged as the bearing moves back and forth due to a pendulum-like swing of the bearing as it restores its originals position.

Preferably, although not necessarily, the substantially directly opposing upper and lower recessed bearing surfaces have substantially identical load-bearing surfaces comprising composite curved and flat angled cross-sectional indentations, preferably substantially as described above. Although the isolation bearing in FIGS. 2 and 3 are shown as having a single pair of first and second recessed bearing surfaces, it is to be understood there are a plurality of bearings comprising such bearing surface pairs with at least one rolling rigid ball disposed between each of the pairs, as is described further, in the seismic isolation systems of the present invention.

Figure 4:
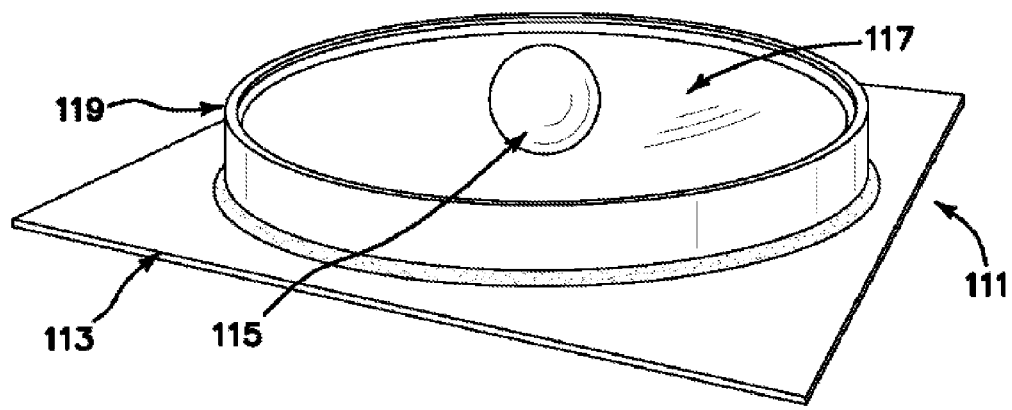
FIG. 4 is a top view of a footplate in accordance with an embodiment of the present invention having a composite bearing surface and a circular rim.

FIG. 4 shows a preferred embodiment of a footplate 111 having a composite bearing surface substantially as in the embodiment shown in FIG. 2 and FIG. 3 used in an isolation system of the present invention. This figure shows the flat plate region 113 of the foot plate 111 that is joined to the floor, foundation, or pad. In one embodiment, the footplate may be fitted into a recess in the floor, foundation or base and then secured to the floor or foundation, or secured directly to the floor or foundation, such as with bolts, cement, etc.

Figure 5:
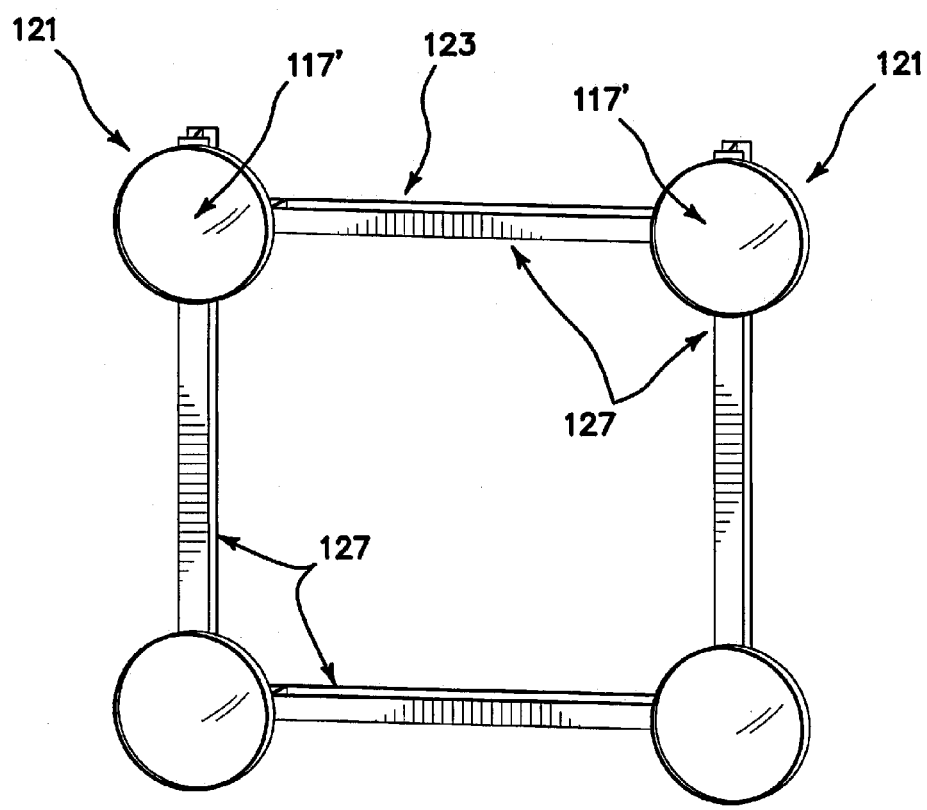
FIG. 5 is a top view of an embodiment of a portion of the isolation system showing an assembly showing four bearing halves each joined to the bottom surface of a portion of a rigid frame.

Shown in FIG. 5 is a view of a partially assembled embodiment of the present invention comprising a partially constructed frame 123 with four isolation bearing halves 121 (only two are visible in FIG. 5) joined to the bottom surface of a portion of the frame 123. The placement of the bearings is substantially symmetrical about the intersections 125 (see FIG. 9) of the elongate member components 127 that are part of an extendable network of elongate members adapted to accommodate varying sizes or configurations of payloads to be isolated from seismic vibrations. The frame of this portion embodiment of the isolation system is to be coupled with four footplates 111 to be disposed such that the upper/downward facing bearing surfaces 117' of the bearing halves substantially directly oppose the lower/upward facing bearing surfaces 117 of each of the four footplates 111. When assembled, four rigid balls 115, are each disposed in the cavities between a respective downward-facing and upward-facing recessed bearing surface of an assembled isolation bearing to form a portion of an embodiment of a seismic isolation system of the present invention. The bearing halves 121, just as the footplates, have circular rims substantially identical to those shown in 119.

Using a plurality of footplates 111 and isolation bearing halves 121 fitted on a rigid frame 123 comprising elongate members 127 along with rigid balls 115 disposed in the cavities of corresponding composite recessed bearing surface pairs 117 and 117' assembled as described above, various apparatus, such as seismic isolation systems, isolation platforms, isolation floors and the like can be fabricated.

Figure 6:
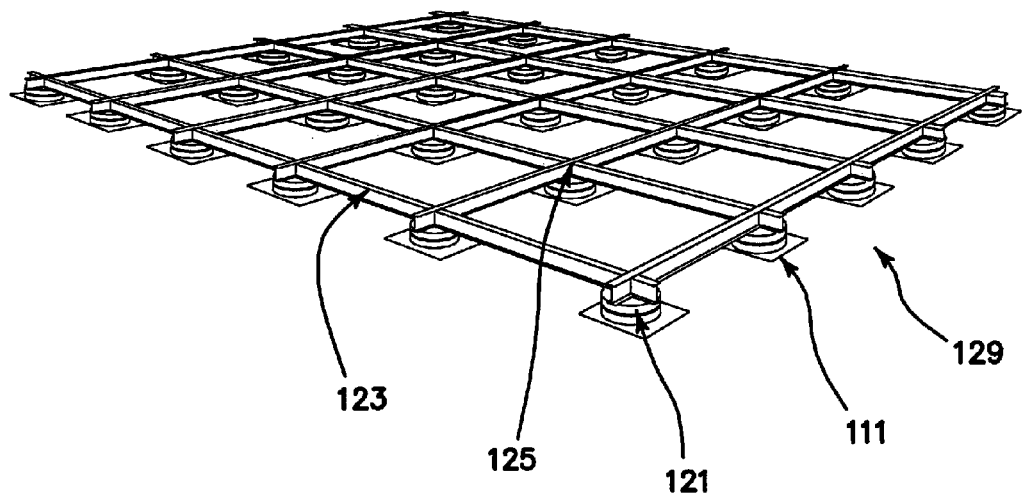
FIG. 6 is a perspective top view during assembly of an embodiment of a seismic isolation system in accordance with the present invention prior to the horizontal support panel being installed.

Shown in FIG. 6 is a perspective top view of an embodiment of a partially assembled, extendable seismic isolation system 129 in accordance with the present invention wherein a horizontal support panel has not yet been installed. Note that in this embodiment of the invention, the footplates are joined to the foundation or slab substantially at the level of the surrounding foundation; i.e., without a recess in the foundation or slab. When configured in this way no gap in the foundation is required in order for the support panel of the isolation system to move in reaction to a seismic tremor. However ample space for such movement must be provided around the support panel. In other embodiments the footplates are secured to the foundation or slab within a recess permitting the support panel to be at the same level as the surrounding foundation; the recess also defines a gap between the isolation system and the Shown in FIG. 7 is a perspective top view of a fully assembled version 131 of the seismic isolation system 129 shown in FIG. 6 wherein the horizontal support panel 133 has partially been installed.

Figure 7:
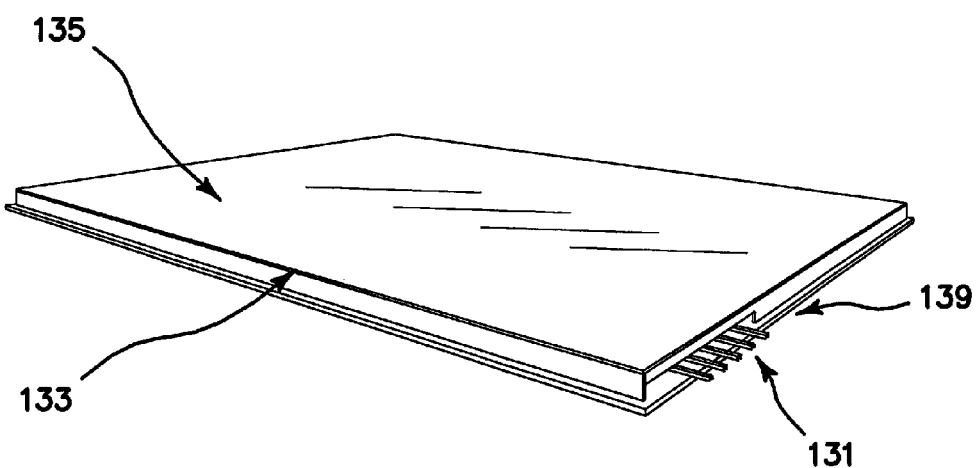
FIG. 7 is a perspective top view of the seismic isolation system shown in FIG. 6 wherein the horizontal support panel has been partially installed.

Thus, taken together, FIGS. 6 and 7 together depict an embodiment of an isolation system 131 in accordance with the present invention comprising:

a) a horizontal support panel 133 having a top surface 135 and a bottom surface 137 (not shown here, but shown in FIG. 9), wherein the horizontal support panel 133 is structured to support a payload of appropriate weight on the top surface 135;

b) a rigid first frame 123 adapted to support the support panel 133, wherein said first frame 123 is joined to the bottom surface 137 of the support panel;

c) a plurality of isolation bearing halves 121 wherein each bearing half is directly connected to the bottom side of said first frame 123 and each bearing half comprises a downward-facing recessed bearing surface 117';

d) a plurality of seismic isolation footplates 111, each footplate comprising a upward-facing recessed bearing surface 117 and wherein each of said footplates 111 is directly joined to a flooring, slab or foundation 139 wherein, in this case, the upward-facing recessed bearing surface 117 of each of said footplates 111 is a mirror image of and opposes a downward-facing recessed bearing surface 117' of a corresponding seismic bearing half 121 disposed substantially directly opposite the footplate, thereby defining a cavity therebetween;

e) a plurality of rigid balls 115 located in each of such cavities and structured to be sufficiently hard to support the payload in combination; wherein, in the event of a seismic vibration causing the footplates 111 to move, the inertia of the payload, the support panel 133, the first frame 123 and the bearing halves 121 causes the rigid balls 115 in the cavities therebetween to roll upwards from the corresponding said upward-facing recessed bearing surfaces 117, thereby cushioning the payload from the full force of said seismic vibration.

Figure 8:
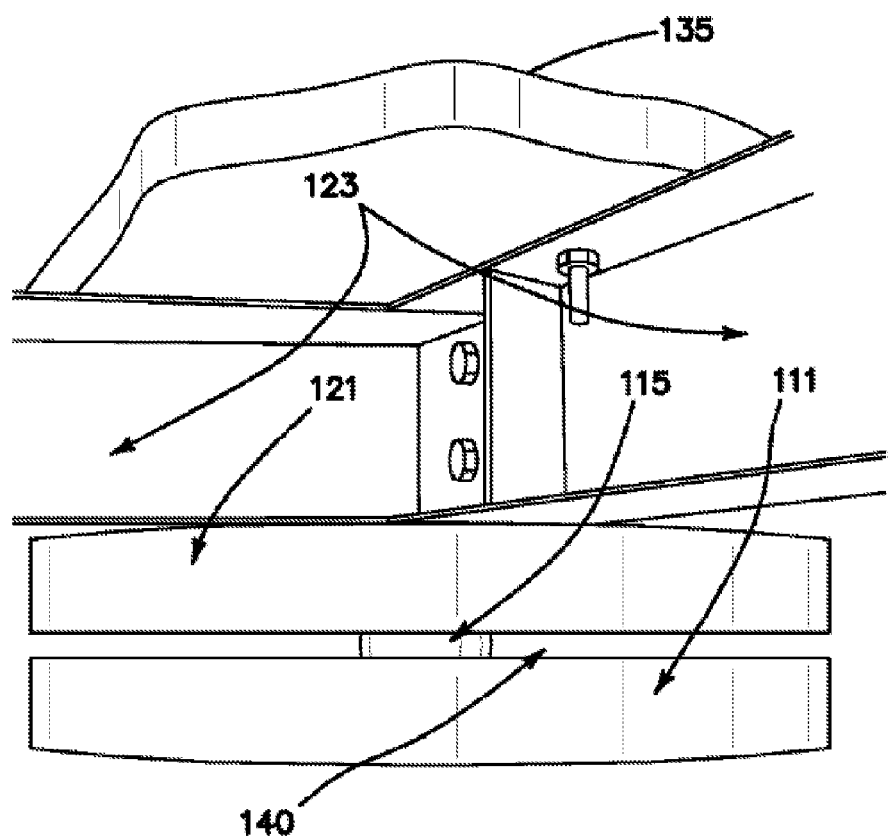
FIG. 8 is a partial side view of an isolation bearing comprising a bearing half, footplate and portion of the frame and support plate in accordance with the embodiment in FIG. 6.

FIG. 8 is a partial side view of an isolation bearing comprising a bearing half 121, footplate 111 and portion of the frame 123 and support plate, in accordance with the embodiment in FIG. 6. This figure shows that once the rigid ball 115 is disposed in the cavity formed by the recessed bearing surfaces 117 and 117' (not shown), the circular rims 119 and 119' defining the bearing half 121 and footplate 111 do not contact each other and define a gap 140 to lessen the possibility of friction between bearings causing bearing failure during use.

Figure 9:
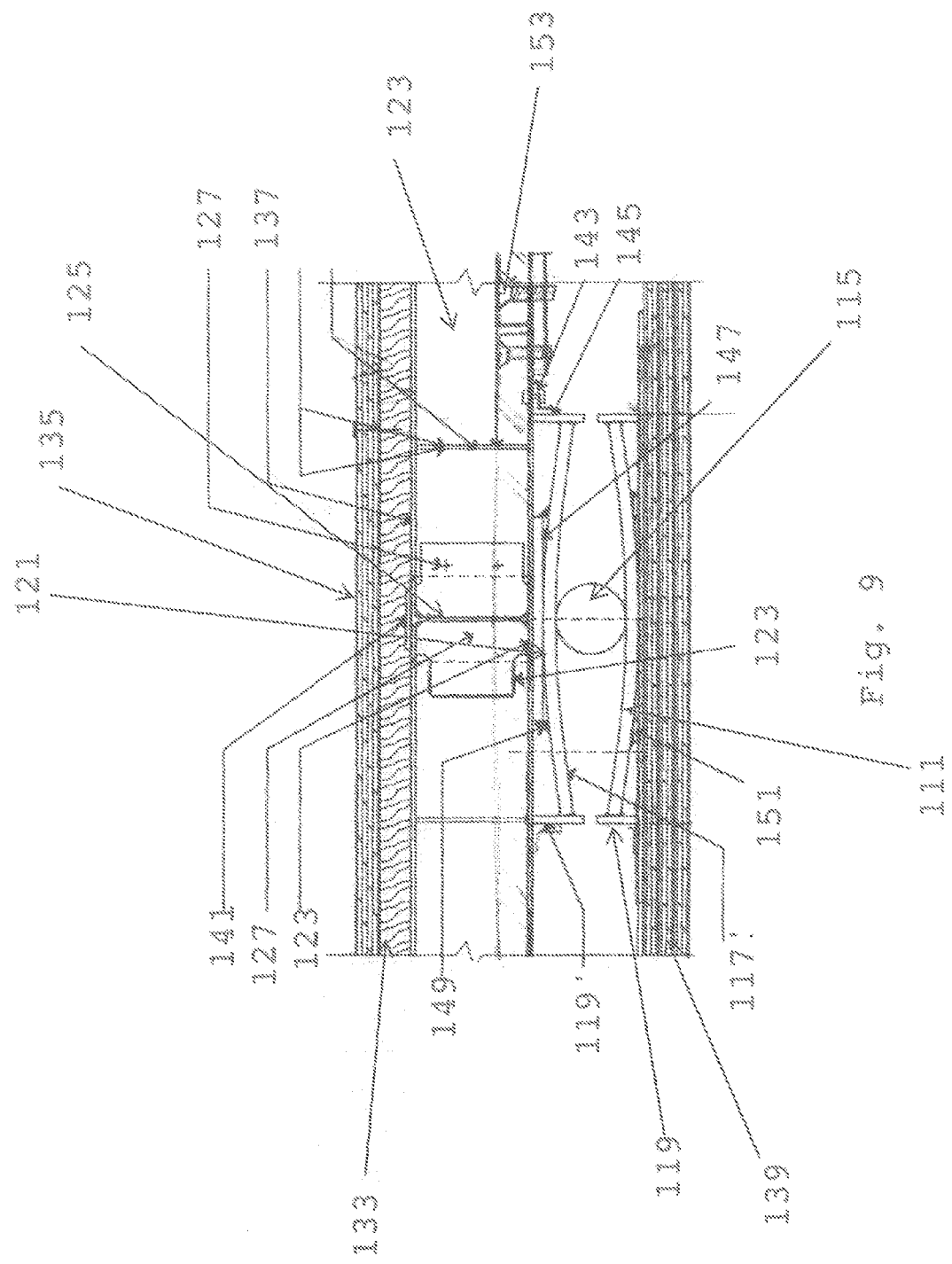
FIG. 9 is a cross-sectional view of a resting position of an isolation bearing comprising bearing half footplate, rigid ball, frame and support panel in accordance with an embodiment of the invention with the rigid ball disposed in the cavity between the corresponding downward-facing and upward-facing recessed bearing surfaces.

FIG. 9 is a cross-sectional in situ view of a portion of an isolation system at equilibrium according to the present invention comprising an isolation bearing comprising a bearing half 121 and footplate 111 consistent with the embodiment shown in FIGS. 6-8. The rigid ball 115 is disposed in the cavity defined between the corresponding upper and lower recessed bearing surfaces 117 and 117'. Shown in FIG. 9 is a cross-sectional view of the horizontal support panel 133 having a top surface 135 structured to support a payload to be isolated from a seismic vibration and a bottom surface 137 that is joined to a rigid frame 123. In this and other preferred embodiments the support panel is joined to the frame substantially symmetrically about the intersections 125 (not shown here, but shown in FIGS. 6 and 9) of the elongate member components 127 that are part of the reinforced network of elongate members to accommodate the payload to be isolated from seismic vibrations.

Also shown in FIG. 9 is a welded connection 141 to secure component rigid elongate members 127 of the frame 123. Also shown are bolts 143 and welds 145 used to join bearing half 121 to the frame 123. The downward facing rigid bearing surface 117' bearing element of bearing half 121 is also shown in this figure as being supported by a plate element 147 and weld 149 at the bottom side of the bearing surface 117'. The bearing surface 117 is similarly supported at its bottom surface/side by weld 151 to footplate 111. Various alternative means and methods of joining the rigid frame 123 and support panel 133, such as bolts, etc., (such as 153) can be used.

Those of ordinary skill in the art will understand that various effective ways exist of securing components such as bearing halves, support panels, elongated members or girders; these including, without limitation, bolting, welding, one-piece casting, cementing or gluing, and the like.

From FIG. 9, it can be seen that the bearing half 121 has a circular rim 119' extending vertically at the edge of, and substantially perpendicular to, the bearing surface 117' and from the bottom of the bearing half 121, just as the footplate 111 has a circular rim 119 extending vertically from the bottom of, and substantially perpendicular to, the footplate along the edge of bearing surface 117.

Figure 10:
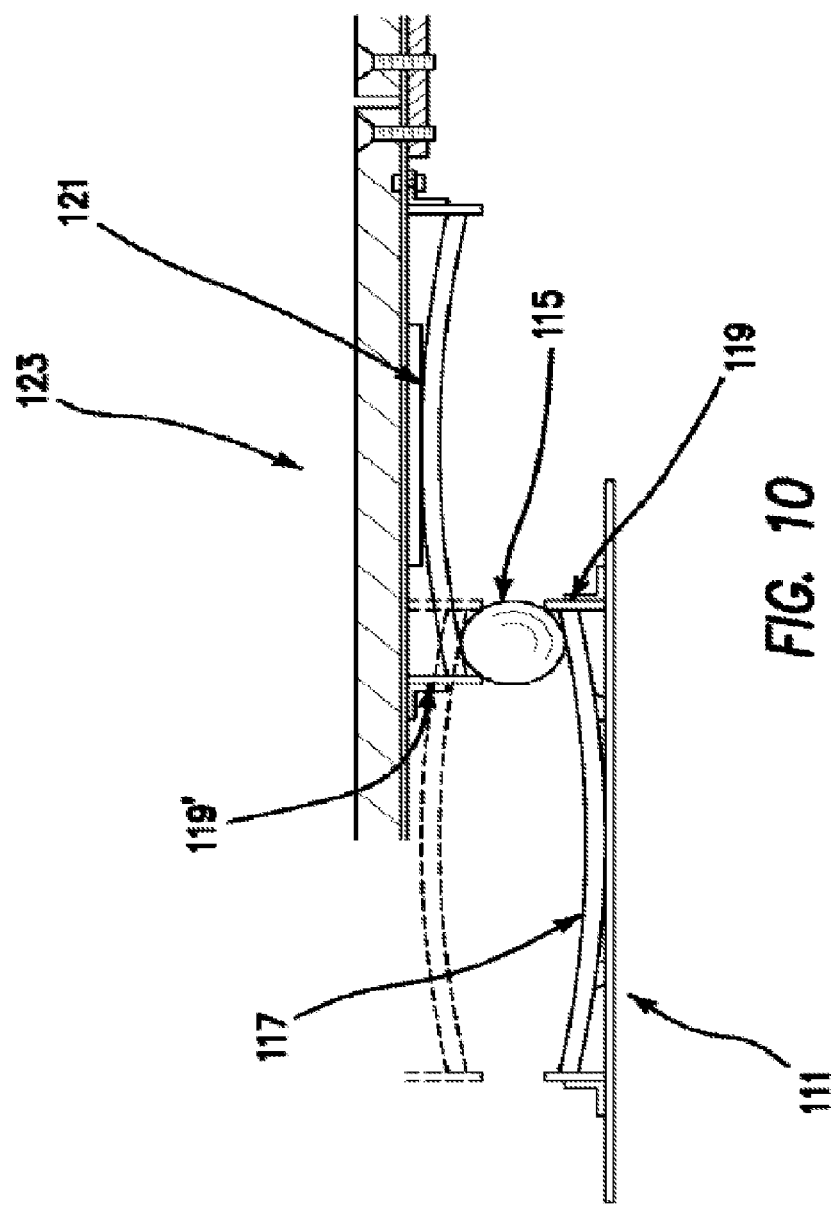
FIG. 10 is a cross-sectional view of an isolation bearing in accordance with an embodiment of the invention showing a bearing half and a footplate with the rigid ball disposed in the cavity between the corresponding downward-facing and upward-facing recessed bearing surfaces, when the bearing half has been displaced to the maximum extent with respect to the upward-facing bearing surface of the footplate.

FIG. 10 is a cross-sectional view of an isolation bearing comprising bearing half 121 and footplate 111 in accordance with the embodiment in FIGS. 6-9; the rigid ball 115 is disposed in the cavity between the corresponding first and second recessed bearing surfaces 117' and 117, and the bearing is in a displaced position. In this figure, the rigid ball 115 has rolled within the cavity formed by the upward-facing recessed bearing surface 117 in the footplate 111 and corresponding downward-facing recessed bearing surface 117' of the isolation bearing half 121, and is positioned in contact with rims 119 and 119'. The dotted lines show the position of the (upper) bearing half in the rest position.

Figure 11:
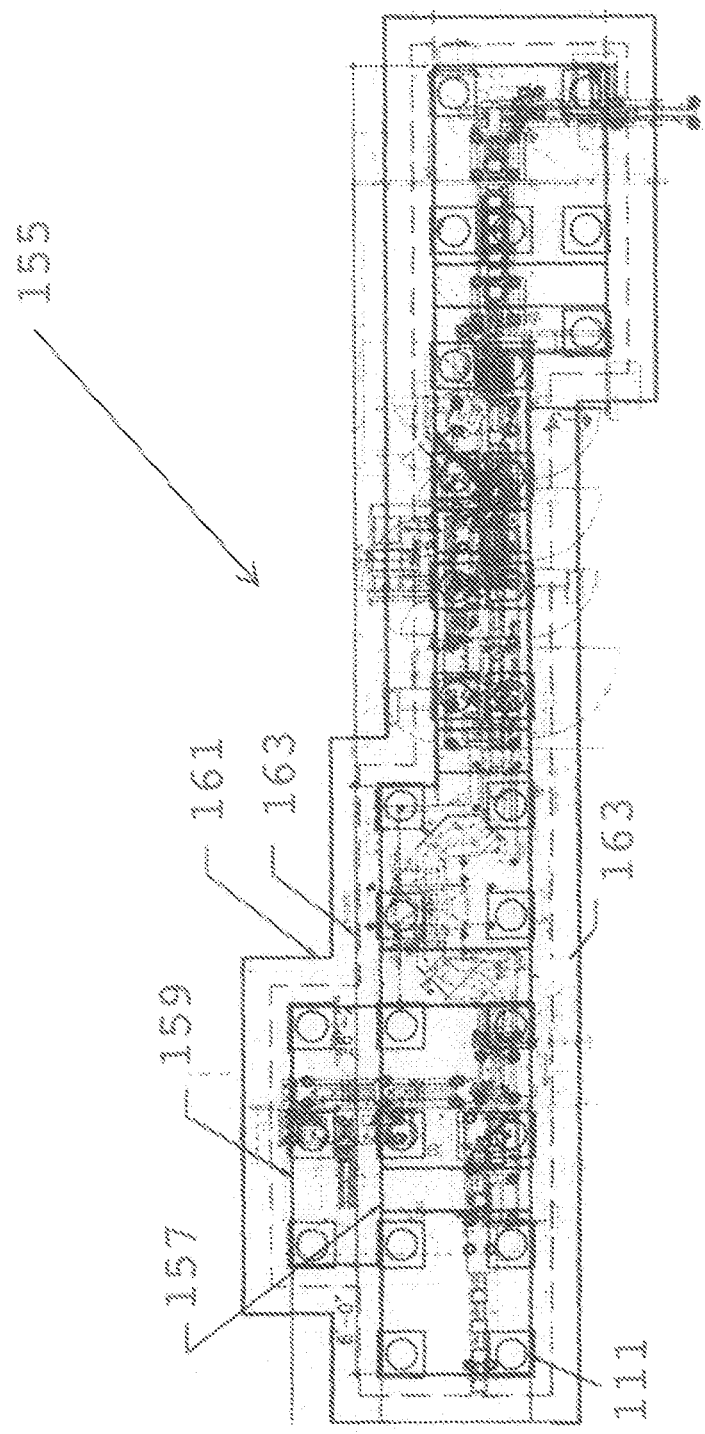
FIG. 11 is a top view of a plan for isolating a syringe line apparatus using a rolling ball-type isolation bearing according to another embodiment of the seismic isolation system of the present invention.

FIG. 11 is a schematic diagram comprising top view of an embodiment of a complete industrial seismic isolation system. In this case the payload is a product processing syringe line apparatus isolated using a composite surface rolling ball type isolation bearing system. In this embodiment, the horizontal support panel comprises a plurality of individual panels (which may comprise layered, laminated, or solid panels) that are bolted together, and shown here is bolted panel joint 157. Also, in this embodiment, the isolation system 155, is secured via the component footplates 111, in a recess in the foundation in a manner causing the top surface 135 of the horizontal support panel to be substantially level with the foundation, the recess being adapted to include a gap or void between the isolation system and foundation to accommodate an isolating movement of the horizontal support panel, the payload (for example, a syringe line), first frame 123 and bearing halves 121 in response to a seismic vibration within the gap or void and, to permit installation of flexible lines of supply to the payload within the gap or void. Thus, the outer edge 159 of the isolation system 155, or shown here as the edge of the top surface of the horizontal support panel 133 of the isolation system and the outer edge 161 of the recess in the foundation upon which the isolation system rests define a gap 163 between the isolation system and the foundation.

Figure 12:
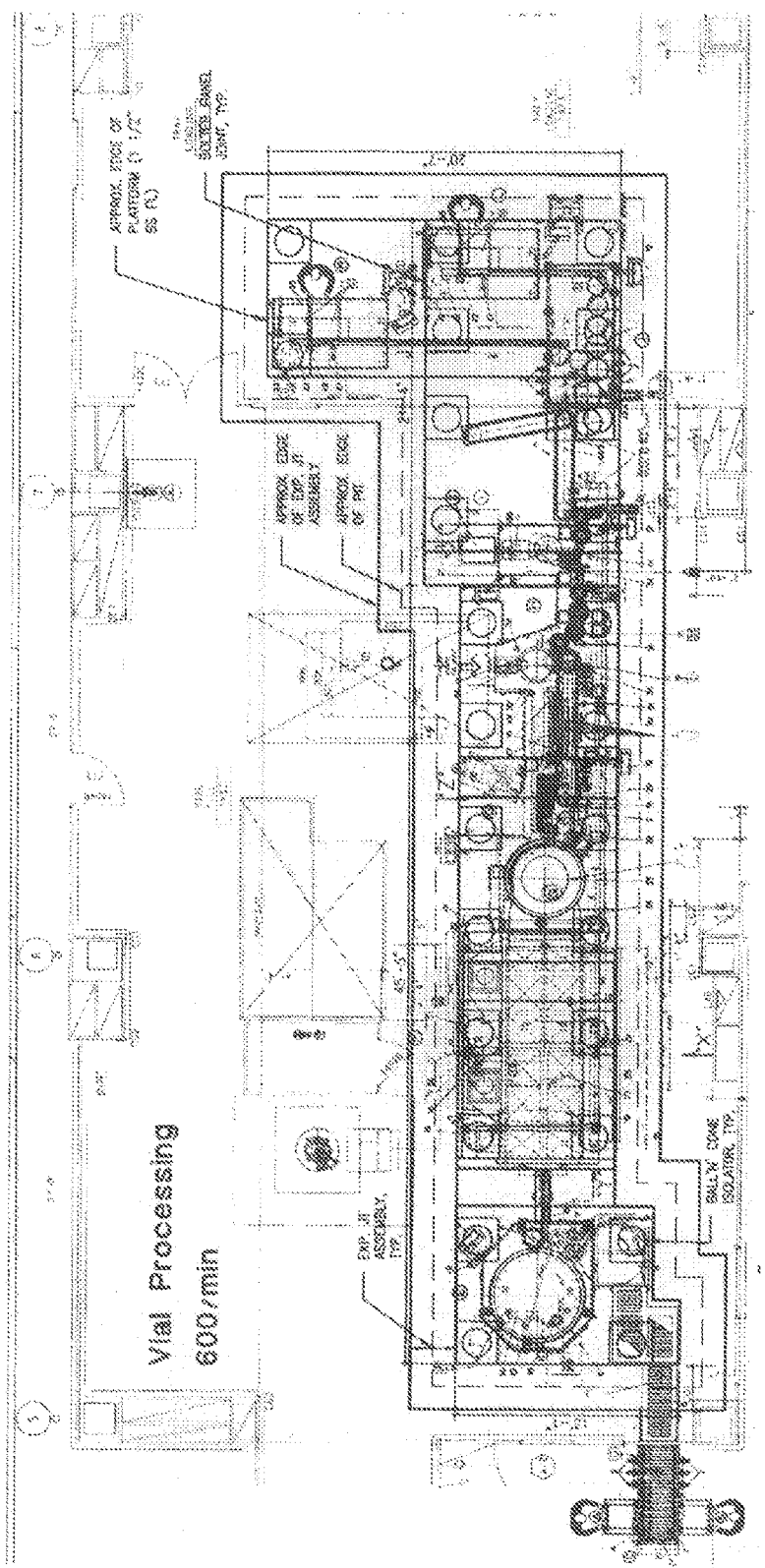
FIG. 12 is a top view of a plan for isolating a vial processing apparatus using a rolling ball-type isolation bearing according to another embodiment of the seismic isolation system of the present invention.

FIG. 12 is a top view of another seismic isolation system for isolating a payload consisting of a vial filling line using a ball and cone type isolation bearing.

In yet another embodiment of the present invention, the seismic isolation system of the present invention is adapted and structured for placement on a cement or concrete pad or slab, preferably on the outside of a structure. In certain cases computer servers and/or other payloads are desired to be placed outside main buildings and to be contained within a weather-resistant shed particularly made or acquired to house such payloads. Such outside placement permits more facile addition and modification of payloads, since the payloads (and in certain cases the structures or "outbuildings" that house them) can be transported by truck and easily moved into place to be supported by the claimed seismic isolation system. Moreover, an array of pads or "pad farm" may be easily created to add new storage space for computers, hazardous chemicals, chemical waste, and the like as desired.

The slab is generally from about 6 inches to about 1 foot in thickness; specific variations in this thickness may be indicated from location to location according with local building code requirements. The upward-facing bearing surfaces may be contained in footplates that are joined to the pad; they may be embedded in the pad or joined using bolts or other securing joining means. The pad is usually reinforced using materials such as steel rods or rebar to prevent cracking.

In this embodiment of the invention, the upper, downward-facing bearing surfaces of the isolation bearing halves are joined to a first frame or support panel that either comprises, or is itself joined to a second frame or support panel that comprises, a structural floor component of a housing such as a shipping container, a mobile home or prefabricated "outbuilding" or the like, within which the payload is protected from direct sunlight, rain, snow, and the like.

The housing, which is generally relatively lightweight, may contain an air conditioning and/or heating unit to maintain a substantially constant temperature for the payload within the housing.

Figure 13:
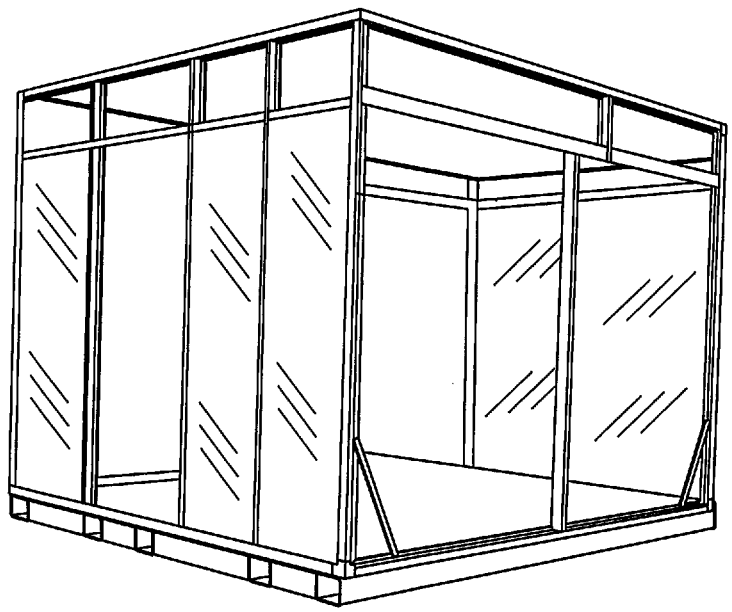
FIG. 13 is a view of a partially prefabricated external structure for containing a payload.
Figure 14:
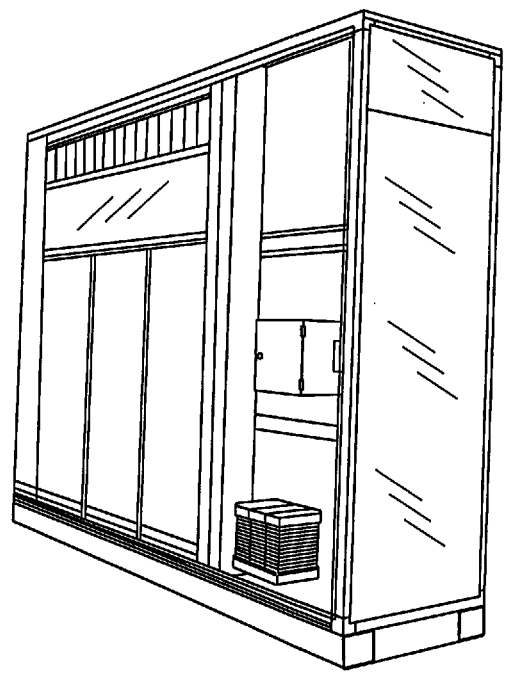
FIG. 14 is a view of a segment of a prefabricated structure for containing a payload, comprising air conditioning equipment.

In presently preferred embodiments the housing comprises more than one prefabricated subunit, which can be quickly assembled in situ. FIG. 13 shows an embodiment of such a housing under construction; FIG. 14 shows a temperature control subunit of such a housing containing air conditioning equipment; a similar temperature control subunit can be seen in FIG. 13 at the far side of the housing. These figures also illustrate that the bottom frame or plate of the housing comprises a series of open, approximately tubular structures structured to fit the tines of a forklift to facilitate movement of housing subunits into position for assembly, and for final assembly of the seismic support structure.

The downward-facing bearing halves are secured joined to the bottom frame or plate of the housing, preferably, although not invariably, at each of the four corners of the structure; additional bearing halves may be added as necessary. As in other embodiments, the bearing halves are joined to the bottom frame or plate of the housing securely; preferably using bolts or welding.

In this and every aspect of the invention disclosed and claimed herein it is preferred that the upward-facing and downward-facing bearing surfaces are identical, so as to provide parallel opposing slopes for the rolling ball during a tremor. If this is not the case the force exerted at the top and the bottom is not the same, and sliding of the rolling ball is more likely, which will result in uneven offsets. This is particularly true when in addition to the slope being on the bottom, the dissipative element (such as damping) is only on the bottom.

Although FIGS. 13 and 14 show a housing in which the bottom frame or plate of the housing is made of metal, in other cases the frame or plate of the housing may partly or wholly comprise a wood, a polymeric alloy (such as a thermoplastic), a carbon fiber structure, a fiberglass structure, or a combination of two or more of all of these.

It is preferred that the payload within such housing be secured firmly within the housing to prevent payload toppling in the housing or through the walls of the housing.

Although the foregoing invention has been described in detail for purposes of clarity of understanding, it will be obvious that certain modifications may be practiced within the scope of the appended claims. Additionally, features illustrated herein as being present in a particular embodiment are intended, in aspects of the present invention, to be combinable with features not otherwise illustrated in this patent application as being present in that particular embodiment.

All publications and patent documents cited herein are hereby incorporated by reference in their entirety for all purposes to the same extent as if each were so individually denoted.

We claim:

1. A seismic isolation system for supporting a payload comprising:
   a) a horizontally oriented support panel having a top surface and a bottom surface, wherein said support panel is structured to support the payload placed on the top surface thereof;
   b) a rigid frame joined to and structured to support said support panel and payload;
   c) a plurality of downward-facing isolation bearing halves joined to a bottom side of said rigid frame, wherein each downward-facing bearing half comprises a downward-facing recessed bearing surface;
   d) a plurality of seismic isolation footplates, each footplate comprising a upward facing bearing half comprising a recessed upward-facing bearing surface wherein each of said footplates is securely joined to a foundation and the upward facing recessed bearing surface of each of said footplates opposes a second, downward facing recessed bearing surface of a corresponding downward-facing bearing half and defines a cavity therebetween;
   e) at least one rigid ball located in each of such said cavities, said ball being structured to be sufficiently strong to maintain a gap between downward and upward-facing bearing halves during operation; and
   wherein, in the event of a seismic vibration each downward-facing bearing half moves relative to its corresponding opposing footplate thereby cushioning the payload from the full force of said seismic vibration, and said system lacks an underfloor substructure comprising pedestals.

2. The isolation system of claim 1 wherein said horizontally oriented support panel comprises a single panel sheet.

3. The isolation system of claim 1 wherein said horizontally oriented support panel comprises a plurality of panel sheets.

4. The isolation system as in claim 1 wherein said frame comprises a network of rigid elongate members and wherein each of said plurality of isolation bearing halves is joined to the bottom side of said frame.

5. The isolation system of claim 1 wherein said frame is bolted to the support panel.

6. The isolation system of claim 1 wherein at least one of the opposing upward-facing and downward-facing recessed bearing surfaces in each corresponding bearing half comprises an exterior rim structured to prevent movement of said rigid balls from the corresponding cavities formed thereby.

7. The isolation system of claim 6 wherein the bearing surfaces of each bearing do not contact each other in the resting position.

8. The isolation system of claim 1 wherein each of at least one set of opposing upward and downward-facing recessed bearing surfaces are at least partially conical in shape.

9. The isolation system of claim 1 wherein each of at least one set of opposing upward and downward-facing recessed bearing surfaces are partially spherical and partially concave in shape.

10. The isolation system of claim 1 wherein each of at least one set of opposing upward and downward-facing recessed bearing surfaces have a shape comprising a combination of conical and spherical shapes.

11. The isolation system of claim 1 wherein the diameter of each of the opposing upward and downward-facing recessed bearing surfaces is between about 8 inches and about 36 inches.

12. The isolation system of claim 1 further comprising a rigid, second frame joined to a foundation and comprising a network of rigid elongate members, wherein said second frame is joined to each of said plurality of footplates comprising upward-facing recessed bearing surfaces.

13. The isolation system of claim 1 wherein each of said footplates is locatable in a recess in a floor or foundation and securable to said floor or foundation.

14. The isolation system of claim 13 wherein the support plate of the isolation system is substantially level with the surrounding foundation, and wherein said recess defines a gap between said isolation system and the surrounding foundation sufficiently large to accommodate the necessary movement of the horizontal support panel, payload, said rigid frame and downward-facing bearing halves in response to a seismic vibration of the foundation.

15. A method for isolating a payload from vibration comprising:
supporting a payload on a seismic isolation system lacking an underfloor substructure comprising pedestals, said system comprising:
a) a horizontal support panel having a top surface and a bottom surface, wherein said support panel is structured to support said payload;
b) a rigid frame structured to support the payload and said support panel, wherein the frame is joined to the support panel;
c) a plurality of isolation bearing halves wherein each bearing half is joined to said frame and each bearing half comprises a downward-facing recessed bearing surface;
d) a plurality of isolation footplates, each footplate comprising a upward-facing recessed bearing surface and wherein each of said footplates is joined to a foundation wherein the upward-facing recessed bearing surface of each of said footplates opposes a downward-facing recessed bearing surface of a corresponding bearing half and defines a cavity therebetween;
e) a rigid ball sufficiently hard to support said payload located in each of such said cavities;
wherein, in the event of a seismic vibration each downward-facing bearing half moves relative to its corresponding opposing footplate thereby cushioning the payload from the full force of said seismic vibration.

16. A seismic isolation system comprising:
a) a support panel structured to support an industrial payload;
b) a frame sufficiently strong to support the industrial payload joined to the support panel comprised of connected elongate structural members comprising a metal or metal alloy;
c) a plurality of downward-facing isolation bearing halves joined to said frame, said bearing halves having downward-facing recessed bearing surfaces;
d) a plurality of upward-facing isolation bearing halves having upward-facing recessed bearing surfaces joined to a foundation and opposing corresponding downward-facing recessed bearing surfaces to define a plurality of cavities;
e) at least one rigid ball contained within each cavity, separating said downward-facing bearing halves from said upward-facing bearing halves and bearing at least a portion of the weight of the payload,
wherein the recess of at least one of the upward-facing recessed bearing surfaces and opposing corresponding downward-facing recessed bearing surfaces defining each cavity comprises a wholly or partially conical, spherical or parabolic-shaped cross-sectional shape, and
wherein the support panel is substantially level with the surrounding floor or foundation and surrounded by a recess defining a gap between the support panel and surrounding floor or foundation permitting movement of the support panel relative to the floor or foundation during a seismic tremor, and wherein said system lacks an underfloor substructure comprising pedestals.

17. The isolation system of claim 16 wherein the elongate structural members comprise metal girders.

18. The isolation system of claim 16 wherein the support panel comprises layers of different materials.

19. The isolation system of claim 16 wherein the cross-sectional shape of each set of opposing downward-facing and upward-facing recessed bearing surfaces is identical.

20. The isolation system of claim 16 wherein the cross-sectional shape of at least one of opposing downward-facing and upward-facing recessed bearing surfaces comprises a first shape selected from the group consisting of a partially conical, spherical or parabolic cross-sectional shape and at least one additional second shape.

21. The isolation system of claim 20 wherein the cross-sectional shape of each set of opposing downward-facing and upward-facing recessed bearing surfaces is identical.

22. The isolation system of claim 20 wherein the cross-sectional shape of at least one of opposing downward-facing and upward-facing recessed bearing surfaces comprises a first shape selected from the group consisting of a linear cross-sectional shape and a curved additional second shape.

23. The isolation system of claim 16 wherein the opposing downward-facing and upward-facing recessed bearing surfaces are between about 8 inches and about 36 inches in diameter.

24. The isolation system of claim 22 wherein the opposing downward-facing and upward-facing recessed bearing surfaces are between about 8 inches and about 36 inches in diameter.

25. The isolation system of claim 22 wherein the cross-sectional shape of each set of opposing downward-facing and upward-facing recessed bearing surfaces comprises a first shape selected from the group consisting of a linear cross-sectional shape and a curved additional second shape.

26. A seismic isolation system comprising a housing structured to contain a payload, said housing having a bottom frame or plate comprising a top surface and a bottom surface; a plurality of bearing halves comprising recessed downward-facing bearing surfaces joined to said housing bottom frame or plate and projecting below the bottom surface of said bottom frame or plate; a plurality of footplates comprising recessed upward-facing bearing surfaces oriented to directly oppose corresponding recessed downward-facing bearing surfaces and defining a plurality of cavities between opposing recesses thereof; at least one rigid ball within each said cavity resting on a recessed upward-facing bearing surface and supporting a recessed downward-facing bearing surface, wherein said footplates are joined to a pad structured to support said seismic isolation system, said housing and payload, and said system lacks an underfloor substructure comprising pedestals.

* * * * *